US009487284B2

(12) United States Patent
Crane et al.

(10) Patent No.: US 9,487,284 B2
(45) Date of Patent: Nov. 8, 2016

(54) CONTROL DEVICE FOR A POWER DISTRIBUTION SYSTEM

(75) Inventors: Allan David Crane, Gwynedd (GB); Nicholas Simon Smith, Warwickshire (GB); Ralph Edwin Maltby, Northamptonshire (GB)

(73) Assignee: GE Energy Power Conversion Technology, Ltd., Rugby, Warwickshire (GB)

( * ) Notice: Subject to any disclaimer, the term of this patent is extended or adjusted under 35 U.S.C. 154(b) by 778 days.

(21) Appl. No.: 13/702,092

(22) PCT Filed: Jun. 6, 2011

(86) PCT No.: PCT/EP2011/002757
§ 371 (c)(1),
(2), (4) Date: Mar. 12, 2013

(87) PCT Pub. No.: WO2011/154117
PCT Pub. Date: Dec. 15, 2011

(65) Prior Publication Data
US 2013/0200691 A1 Aug. 8, 2013

(30) Foreign Application Priority Data

Jun. 8, 2010 (EP) .................................... 10005871

(51) Int. Cl.
*B63H 23/24* (2006.01)
*H02J 4/00* (2006.01)
*B63J 3/04* (2006.01)

(52) U.S. Cl.
CPC ................ *B63H 23/24* (2013.01); *B63J 3/04* (2013.01); *H02J 4/00* (2013.01); *B60L 2200/32* (2013.01)

(58) Field of Classification Search
CPC .............. B63H 23/24; B63J 3/04; H02J 4/00
USPC ......................................................... 307/9.1
See application file for complete search history.

(56) References Cited

U.S. PATENT DOCUMENTS 5,280,418 A * 1/1994 Griffin ............................. 363/34
6,592,412 B1 * 7/2003 Geil ........................ B63B 1/042
114/144 E (Continued)

FOREIGN PATENT DOCUMENTS

EP 2077226 A2 * 7/2009
EP 2090508 A2 * 8/2009

(Continued)

*Primary Examiner* — Jared Fureman
*Assistant Examiner* — Michael Warmflash
(74) *Attorney, Agent, or Firm* — Wood IP LLC

(57) ABSTRACT

In a marine power distribution and propulsion system with a medium voltage distribution busbar (MVAC1) and a low voltage distribution busbar (LVAC1) then a rectifier (SC) is controlled, optionally to provide active filtering and static compensation benefits. A common power supply system incorporating ac generators (G1-G4) supplies power to the medium and low voltage distribution busbars. The rectifier (SC) is connected to the medium voltage distribution busbar (MVAC1). A controller (Co) uses feedback signals indicative of electrical quantities of the distribution voltages carried by both the medium voltage and low voltage distribution busbars (MVAC1, LVAC1) to control the rectifier (SC) to regulate electrical quantities at the ac terminals of the rectifier (SC) in order to achieve desired electrical quantities of the distribution voltage carried by the low voltage distribution busbar (LVAC1).

17 Claims, 9 Drawing Sheets

(56) References Cited

U.S. PATENT DOCUMENTS

| | | | | |
|---|---|---|---|---|
| 7,282,878 | B1* | 10/2007 | Rakov | H02P 25/026 318/400.01 |
| 7,373,527 | B2* | 5/2008 | Chapuis | 713/300 |
| 7,402,977 | B2* | 7/2008 | Kim et al. | 318/798 |
| 7,969,044 | B2* | 6/2011 | Armstrong | B60L 11/08 307/44 |
| 2004/0104704 | A1* | 6/2004 | Hirono | H02P 21/0042 318/722 |
| 2004/0189271 | A1* | 9/2004 | Hansson et al. | 323/283 |
| 2008/0152326 | A1* | 6/2008 | Oomura | H02P 21/0035 388/813 |
| 2008/0174177 | A1* | 7/2008 | Langlois et al. | 307/9.1 |
| 2010/0094490 | A1* | 4/2010 | Alston | B63H 21/17 701/21 |
| 2010/0106350 | A1* | 4/2010 | Alston | 701/21 |
| 2010/0283318 | A1* | 11/2010 | Crane et al. | 307/9.1 |
| 2010/0308653 | A1* | 12/2010 | Gestri | B60R 16/03 307/26 |
| 2011/0133546 | A1* | 6/2011 | Jang et al. | 307/9.1 |

FOREIGN PATENT DOCUMENTS

| | | | |
|---|---|---|---|
| GB | WO 2010020392 A1 * | 2/2010 | H02K 19/34 |
| WO | WO 2010020392 A1 * | 2/2010 | |

* cited by examiner

CONTROL DEVICE FOR A POWER DISTRIBUTION SYSTEM

FIELD OF THE INVENTION

The present invention relates to power distribution systems, and in particular to power distribution systems that can be used onboard marine vessels for supplying power to one or more propulsion motors.

BACKGROUND OF THE INVENTION

An example of a conventional marine power distribution and propulsion system is shown in FIG. 1. A series of diesel engines D are used to drive individual generators G. These supply ac power to a first medium voltage switchboard or busbar MVAC1 and a second medium voltage switchboard or busbar MVAC2. The medium voltage busbars are equipped with protective switchgear that comprise circuit breakers and associated controls and are represented in FIG. 1 by the x symbol. Power converters PC are used to interface the medium voltage busbars to electric propulsion motors PM that drive a propeller. The medium voltage busbars are interconnected by protective switchgear.

Most of the ships services require low voltage and it is convenient to derive this from the medium voltage busbars by using a transformer. In the conventional marine power distribution and propulsion system shown in FIG. 1, a first low voltage switchboard or busbar LVAC1 is connected to the first medium voltage busbar MVAC1 through a first transformer T1 and protective switchgear. A second low voltage switchboard or busbar LVAC2 is connected to the second medium voltage busbar MVAC2 through a second transformer T2 and protective switchgear. The low voltage busbars are interconnected by protective switchgear. A series of unspecified electrical loads (labelled LVAC loads) can be connected to the low voltage busbars.

Although it is convenient to connect the low voltage busbars to the medium voltage busbars, such an arrangement normally leads to problematic coupling of harmonic distortion. In other words, harmonic distortion in the medium voltage busbars caused by the operation of the propulsion motors, for example, will be transferred through the transformers T1 and T2 to the low voltage busbars. If the electrical loads connected to the low voltage busbars require low harmonic distortion (i.e. a high quality of power supply (QPS)) then this may cause potential problems with their normal operation. Also, some of the loads connected to the low voltage busbars may themselves cause harmonic distortion in the low voltage busbars. This will be transferred through the transformers T1 and T2 to the medium voltage busbars.

In order to suppress such harmonic distortion, large and costly filters F are normally connected to the medium voltage busbars. Filters (not shown) may also be connected to the low voltage busbars.

SUMMARY OF THE INVENTION

In the case where a power distribution system provides different ac or dc distribution voltages through different distribution busbars or switchboards then a power converter that is connected to a first distribution busbar can be controlled to regulate the electrical quantities in that distribution busbar with the deliberate intention of achieving desired electrical quantities in a second distribution busbar (e.g. by employing a closed-loop control strategy). For this to be achieved, the first and second distribution busbars must receive power from a common power supply system. The term "electrical quantities" is used herein to refer to any and all of the voltage magnitude, current magnitude, power factor, frequency, harmonic voltage distortion and harmonic current distortion of the respective distribution voltage.

The power distribution system may retain the convenient arrangement where the distribution voltage carried by the second distribution busbar is derived from the distribution voltage carried by the first distribution busbar by means of a transformer. Any harmonic distortion in the first distribution busbar will therefore be transferred through the transformer to the second distribution busbar and vice versa. In an alternative arrangement, the different distribution voltages may be derived directly from an ac generator that forms part of the common power supply system having a plurality of galvanically-isolated stator windings (i.e. a double or multiple output generator). In other words, the first and second distribution busbars may be electrically connected to a respective stator winding of the ac generator. The stator windings have an extremely effective mutual coupling such that the per unit reactive voltage drops that are experienced in the respective stator windings are closely related and may be almost identical. For all practical purposes, the quality of power supply (QPS) on the first and second distribution busbars is therefore identical. Any harmonic distortion in the first distribution busbar will be transferred to the second distribution busbar and vice versa as a result of the mutual coupling between the stator windings in the double or multiple output generator.

More specifically, the present invention provides a power distribution system comprising: first and second distribution busbars each carrying a respective distribution voltage; a common power supply system supplying power to the first and second distribution busbars; a power converter connected to the first distribution busbar, the power converter having ac terminals; and a controller that uses feedback signals indicative of electrical quantities of the distribution voltages carried by the first and second distribution busbars to control the power converter to regulate electrical quantities at the ac terminals of the power converter in order to achieve desired electrical quantities of the distribution voltage carried by the second distribution busbar.

The first and second distribution busbars can be implemented using any suitable cabling or busbar technology.

First Distribution Busbar Carrying an ac Distribution Voltage:

In a first arrangement the common power supply system preferably includes an ac generator having its ac terminals connected to the first distribution busbar, and the first distribution busbar carries an ac distribution voltage.

The first distribution busbar may be divided into two or more sections with the sections being connected together by a switched connection that can be opened to selectively isolate the respective sections from each other. The first distribution busbar may receive power from a plurality of ac generators, optionally configured such that each generator is connected to a different section of the first distribution busbar. The ac generator can be of any suitable type and is/are preferably driven by a prime mover such as a diesel engine, for example. It will be readily appreciated that the power distribution system may have any number and configuration of ac generators and prime movers depending on the power generation requirements.

The ac terminals of the ac generator can be electrically connected to the first distribution busbar by a switched connection that can be opened to selectively electrically isolate the ac generator from the first distribution busbar. The regulation of the electrical quantities in the first distribution busbar will preferably improve the QPS experienced by the ac generator, thereby maximising the output coefficient and operating efficiency of the ac generator.

If the second distribution busbar also carries an ac distribution voltage then the common power supply system may further include a transformer connected between the first and second distribution busbars. The ac distribution voltage for the second distribution busbar is therefore conveniently derived from the ac distribution voltage of the first distribution busbar by means of the transformer. The transformer can be of any suitable type and may optionally employ a phase shift in order to affect a compromise in the QPS on the first and second distribution busbars.

Alternatively, the ac generator can include at least a pair of galvanically-isolated stator windings, a first stator winding supplying a first ac voltage being connected to the first distribution busbar, and a second stator winding supplying a second ac voltage being connected to the second distribution busbar. Two different distribution voltages can therefore be independently obtained directly from the same ac generator. Each stator winding will normally include a plurality of individual stator coils that are connected together in an appropriate manner. The second distribution busbar can carry an ac or dc distribution voltage. If the second distribution busbar carries an ac distribution voltage then it is connected directly to the second stator winding. If the second distribution busbar carries a dc distribution voltage then it is connected to the second stator winding by means of a second power converter.

The power converter will typically be used interface an electrical load to the first distribution busbar. The ac terminals of the power converter are connected to the first distribution busbar and dc terminals of the power converter are connected to an electrical load, optionally by means of an additional power converter (e.g. an active inverter). The primary function of the power converter is therefore to regulate the power flow from the first distribution busbar to the electrical load. This function is referred to herein as "power flow control".

In the case where the power distribution system of the present invention is a marine power distribution and propulsion system then the electrical load will normally include an electric propulsion motor. The propulsion motor can be a dc or ac motor. If the propulsion motor is a dc motor then it can be connected to the first distribution busbar by the power converter which will normally operate as a rectifier (e.g. an ac/dc power converter). If the propulsion motor is an ac motor then it can be connected to the first distribution busbar by the power converter that will normally operate as a rectifier (e.g. an ac/dc power converter) and by an additional power converter that will normally operate as an active inverter (e.g. a dc/ac power converter) and which is connected to the power converter by a dc link. Control of the power converter is dependent upon the presence of a dc link current flowing between the power converter and the dc motor, or between the power converter and the additional power converter that is connected to the ac motor. It will be readily appreciated that the main function of the power converter is to rectify an ac input voltage from the first distribution busbar and provide a rectified dc output voltage. This rectified dc output voltage must be controlled in coordination with the propulsion motor so the dc link voltage can be traded off against dc link current at any particular shaft output power. An ac motor can also be connected to the first distribution busbar by a power converter of the direct frequency type (e.g. an ac/ac power converter), wherein rectifier and inverter functions are integrated to give the same effect as the above rectifier and additional power converter without the presence of a dc link. It therefore follows that the controller for the power converter and a controller for the dc motor, or for the ac motor and additional power converter, must be linked or coordinated. Similarly, when a direct frequency converter is employed, the equivalent rectifier and motor control functions must be linked or coordinated.

The power distribution system may include any suitable number of electrical loads, each being connected to the first distribution busbar by a respective power converter. The power converters associated with the electrical loads can be controlled independently or together as part of a coordinated array or series of power converters as required.

First Distribution Busbar Carrying a dc Distribution Voltage:

In a second arrangement the common power supply system preferably includes an ac generator, the power converter is connected between the ac generator and the first distribution busbar, and the first distribution busbar carries a dc distribution voltage.

The first distribution busbar may be divided into two or more sections with the sections being connected together by a switched connection that can be opened to selectively isolate the respective sections from each other. The first distribution busbar may receive power from a plurality of ac generators, optionally configured such that each generator is connected to a different section of the first distribution busbar, and where a separate power converter is provided between each ac generator and the respective section of the first distribution busbar. The power converters associated with the ac generators can be controlled independently or together as part of a coordinated array or series of power converters as required. The ac generator can be of any suitable type and is preferably driven by a prime mover such as a diesel engine, for example. It will be readily appreciated that the power distribution system may have any number and configuration of ac generators and prime movers depending on the power generation requirements.

The ac terminals of the ac generator can be electrically connected to the power converter by a switched connection that can be opened to selectively electrically isolate the ac generator from the power converter. The regulation of the electrical quantities in the first distribution busbar will preferably improve the QPS experienced by the ac generator, thereby maximising the output coefficient and operating efficiency of the ac generator.

The ac generator preferably includes at least a pair of galvanically-isolated stator windings, a first stator winding supplying a first ac voltage being connected to the first distribution busbar by means of the power converter, and a second stator winding supplying a second ac voltage being connected to the second distribution busbar. Two different distribution voltages can therefore be independently obtained directly from the same ac generator. Each stator winding will normally include a plurality of individual stator coils that are connected together in an appropriate manner. The ac terminals of the power converter are connected to the ac terminals of the first stator winding and dc terminals of the power converter are connected to the first distribution busbar. The dc distribution voltage that is carried by the first distribution busbar is therefore derived by the rectification of the first ac voltage that is supplied by the first stator winding of the double output generator.

The second distribution busbar can carry an ac or dc distribution voltage. If the second distribution busbar carries an ac distribution voltage then it is connected directly to the second stator winding. If the second distribution busbar carries a dc distribution voltage then it is connected to the second stator winding by means of a second power converter. In other words, the dc distribution voltage that is carried by the second distribution busbar can be derived by the rectification of the second ac voltage that is supplied by the second stator winding of the double output generator.

The primary function of the power converter is to regulate the power flow from the ac generator to the first distribution busbar. This function is referred to herein as "power flow control".

An electrical load can be connected to the first distribution busbar. In the case where the power distribution system of the present invention is a marine power distribution and propulsion system then the electrical load will normally include an electric propulsion motor. The propulsion motor can be a dc or ac motor. If the propulsion motor is a dc motor then it can be connected either directly or by means of an interposing dc/dc converter to the first distribution busbar. However, it is more likely that the propulsion motor is an ac motor that is connected to the first distribution busbar by an additional power converter that will normally operate as an active inverter. Control of the power converter is dependent upon the presence of a dc link current flowing between the first distribution busbar and the additional power converter that is connected to the ac motor.

Propulsion Motors and Other Electrical Loads:

The propulsion motor may be part of a propulsion drive system and be located within the hull of a marine vessel (i.e. an in-board propulsion motor driving a propeller via a shaft line with a stern gland), in a pod that is suspended below the hull of the marine vessel to provide both propulsion and steering, or coaxially outside the hull of a submarine, for example. The propulsion motor may be configured with its rotor coaxially inside or outside its stator.

The propulsion motor may be used to drive a propeller, optionally together with a second propulsion motor driving a common propeller (so-called tandem propulsion drives). The propulsion motors forming a tandem propulsion drive may be integrated or separate but will share the same propeller shaft system. It will be readily appreciated that an individual marine vessel may use any particular number and configuration of propulsion motors depending on its propulsion requirements. The propellers may be of any convenient type such as conventional multi-bladed screws or ducted pump jets, for example.

In the case where the power converter is used to connect the propulsion motor to the first distribution busbar then the power electronics for the power converter can be fully integrated with the propulsion motor. For example, the propulsion motor can be a brushless dc motor having an electronic commutator circuit implemented using static power electronics as described in EP 1798847. The electronic commutator circuit may include a stator winding having a number of coils linked by the same number of points of common coupling and an electronic commutator circuit comprising the same number of switching stages. Each switching stage is connected between a respective one of the points of common coupling and first and second dc terminals and includes a first reverse blocking semiconductor power device capable of being turned on and off by gate control having its anode connected to the first dc terminal, and a second reverse blocking semiconductor power device capable of being turned on and off by gate control having its cathode connected to the second dc terminal. The electronic commutator circuit is beneficial in allowing the dc terminal voltage of the motor to be adjusted by electronic means while the excitation is fixed. The dc terminal voltage of the motor can additionally be adjusted by conventional field control means.

One or more electrical loads may also be electrically connected to the second distribution busbar. If the power distribution system is a marine power distribution and propulsion system then the second distribution busbar may be a low voltage (LV) busbar providing power to ships services that are particularly sensitive to harmonic distortion.

Power Converter:

The power converter is preferably operated according to a PWM strategy that is selected or varied by the controller in accordance with the feedback signals, typically to achieve the desired electrical quantities of the distribution voltage carried by the second distribution busbar.

The power converter can be connected to the first distribution busbar by a switched connection that can be opened to selectively electrically isolate the power converter from the first distribution busbar. A switched connection can also be provided between the power converter and an ac generator forming part of the common power supply (i.e. between the ac terminals of the power converter and the ac terminals of the first stator winding) to selectively isolate the power converter from the ac generator.

The power converter can be of any suitable rectifier type (e.g. a matrix converter, current source rectifier, voltage source rectifier or thyristor rectifier) and is most preferably capable of having a reasonable degree of independence between the three main aspects of the control strategy described in more detail below, namely power flow control, power factor control and harmonic control.

A particularly suitable topology for the power converter is a matrix converter of the type disclosed in WO 2006/064279. Such a matrix converter includes three ac voltage lines and two dc voltage lines. In the case of the first arrangement where the first distribution busbar carries an ac distribution voltage then the three ac voltage lines would be connected to the first distribution busbar and the two dc voltage lines would be connected to the electrical load by means of a dc link. In the case of the second arrangement where the first distribution busbar carries a dc distribution busbar then the three ac voltage lines would be connected to the ac terminals of an ac generator forming part of the common power supply system and the two dc voltage lines would be connected to the first distribution busbar. An array of six switches implemented using semiconductor power devices are connected between the three ac voltages lines and the two dc voltage lines. The switches are controlled to open and close in sequence in accordance with a PWM strategy such that each of the three ac voltages lines can be connected to one of the two dc voltage lines when the associated switch is closed. A freewheel path is provided between the dc voltage lines. The addition of the freewheel path provides an additional zero state where all of the switches of the matrix converter are operated to be open such that the dc voltage lines are not connected to any of the ac voltage lines. Instead of causing a large over-voltage, the inductive current load in this zero state is allowed to flow through the freewheel path.

An ac input voltage is supplied to the three ac voltage lines from the first distribution busbar or the ac terminals of the first stator winding of the ac generator and rectified by the matrix converter to provide a dc output voltage on the two dc voltage lines. In the case where the matrix converter is used to interface a propulsion motor to the first distribution busbar then the propulsion motor and any additional power converter must be controlled and regulated to allow the power converter to output any magnitude of dc output voltage that is required to satisfy its ac input voltage requirements. For example, at any particular shaft power and on the basis that the power converter is highly efficient, if the desired power factor must be reduced, dc output current must be increased and dc output voltage must be reduced in order to satisfy the power balance between the ac input voltage and the shaft power. It will be readily appreciated that in practice any power converter will incur small power losses leading to a reduction in the overall system efficiency that will influence this power balance.

It is well known that phase control of a thyristor rectifier can be used to regulate output while influencing power factor according to a known relationship and this principle can be extended to power converters that are controlled by a PWM strategy to influence both power flow through the power converter and power factor. By coordinating the phase control of the power converter with the control and regulation of the propulsion motor and any additional power converter then any reasonable power factor can be achieved while allowing the shaft power to be independently controlled and regulated. In the case of a propulsion motor this coordination provides a first degree of freedom in the control of power factor.

A reduced modulation depth for the PWM strategy will reduce the dc output voltage of the power converter. In this way, the dc output voltage of the power converter may be altered without influencing power factor. Space vector modulation can be used to optimise the switching sequence of line-to-line voltages and zero states in a manner that minimises switching losses. A matrix converter of the type disclosed in WO 2006/064279 provides the benefit of an additional zero state that allows the switching sequence to be further optimised. The PWM strategy can be phase shifted with respect to the ac input voltage so as to influence power factor in the first distribution busbar while modulation depth is independently controlled, for example to maintain shaft power of a propulsion motor or the distribution voltage carried by the first distribution busbar. The selection of a suitable modulation angle for the PWM strategy provides a second degree of freedom in the control of power factor.

The PWM strategy may use synchronous modulation to have a specific effect on the harmonic structure of the ac input voltage. This effect causes only integer harmonics (i.e. harmonics whose frequencies are integer multiples of the fundamental frequency of the ac input voltage) to be generated; the harmonic spectrum being a function of the individual PWM pulse widths and the number of PWM pulses per cycle of the fundamental frequency of the ac input voltage. This effect can be used to achieve selective harmonic elimination but the process is characterised by a lack of independence between modulation depth of the PWM strategy, PWM pulse width and the number of PWM pulses per cycle. For example, if a given number of PWM pulses per cycle is used and modulation depth is adjusted by varying PWM pulse width then the resulting harmonic structure is also affected. When the PWM phase position is also taken into account, selective harmonic elimination becomes very complicated and not fully effective. Even so, selective harmonic elimination provides a viable method of regulating harmonic distortion that may be used in the selection of a suitable PWM strategy.

Although a matrix converter of the type disclosed in WO 2006/064279 provides certain benefits, the same control principles can be applied to any force commutated current source rectifier. The same control principles may also be applied to thyristor rectifiers but only the first degree of freedom in the control of power factor can be obtained. It will also be understood that a thyristor rectifier cannot be used to regulate harmonic distortion in the first distribution busbar.

Whereas current source rectifiers have an ability to operate at low and even zero dc output voltage while providing a substantial degree of power factor and harmonic control, the applicability of voltage source rectifiers must be qualified because they can only provide this power factor and harmonic distortion regulation when their dc output voltage is significantly in excess of the crest of the ac input voltage (the so called step-up mode). However, when operating in a step-up mode, the same control principles may be applied to voltage source rectifiers that are controlled according to a PWM strategy. The full benefits of a voltage source rectifier can be exploited in the case where it is connected by means of a dc link to a suitable inverter (e.g. a voltage source inverter) that is capable of operating in a step-down mode. Such a power converter arrangement can be used to interface an ac electrical load to the first distribution busbar.

In Summary then:

The power flow through the power converter to an electrical load or the first distribution busbar can be regulated by selecting or varying the modulation depth of the PMW strategy.

Power factor at the ac terminals of the power converter can be regulated (e.g. to be unity or any other power factor) by selecting or varying the modulation angle of the PWM strategy—it being appreciated that such regulation can be for the deliberate purpose of regulating the power factor of the distribution voltage carried by the second distribution busbar to be unity or any other desired value, either by transformer coupling or the mutual coupling between the stator windings of a double or multiple output generator forming part of the common power supply system.

The harmonic distortion (or QPS) at the ac terminals of the power converter can be regulated by selecting or varying the harmonic structure of the PWM strategy—it being appreciated that such regulation can be for the deliberate purpose of regulating the harmonic distortion (or QPS) of the distribution voltage carried by the second distribution busbar, either by transformer coupling or the mutual coupling between the stator windings of a double or multiple output generator forming part of the common power supply system.

Where the ac terminals of the power converter are connected to the first distribution busbar then any regulation of power factor and/or harmonic control at the ac terminals of the power converter will produce corresponding regulation of power factor and/or harmonic distortion in the ac distribution voltage carried by the first distribution busbar and experienced by an ac generator forming part of the common power supply system.

Where the ac terminals of the power converter are connected to ac terminals of an ac generator forming part of the common power supply system then any regulation of power factor and/or harmonic distortion at the ac terminals of the power converter will produce corresponding regulation of power factor and/or harmonic distortion in the ac input voltage experienced by a double or multiple output generator forming part of the common power supply system.

Control of the Power Converter:

If the power converter is connected between the first distribution voltage and an electrical load then the first distribution busbar carries an ac distribution voltage, the ac terminals of the power converter are connected to the first distribution busbar, and the dc terminals are connected to the electrical load, optionally by means of an additional power converter which functions as an active inverter. Electrical quantities at the ac terminals of the power converter will therefore correspond to electrical quantities in the ac distribution voltage carried by the first distribution busbar and at the ac terminals of the ac generator forming part of the common power supply system. It will be readily appreciated that in the case where the ac generator is a double or multiple output generator then the ac terminals of the ac generator will be those associated with the first stator winding that is connected to the first distribution busbar and not those associated with the second stator winding that is connected to the second distribution busbar, either directly or by means of a second power converter.

If the power converter is connected between the first distribution voltage and an ac generator forming part of the common power supply then the first distribution busbar carries a dc distribution voltage, the ac terminals of the power converter are connected to the ac terminals of the ac generator forming part of the common power supply system, and the dc terminals are connected to the first distribution busbar. Electrical quantities at the ac terminals of the power converter will therefore correspond to electrical quantities at the ac terminals associated with the first stator winding of the double or multiple output generator.

In both cases the primary function of the power converter is to control the flow of power through it.

The power converter may also be controlled to provide "active filtering" and "static compensation" benefits to the respective distribution voltages. These are referred to herein as "harmonic control" and "power factor control", respectively. Using the power converter to provide active filtering and static compensation removes the need for the large and costly filters that are used in conventional marine power distribution and propulsion systems, these being replaced by smaller filter capacitors. In a first example of power factor control, if a filter capacitor is connected at the ac terminals of the power converter and draws leading VArs then the power converter may be controlled to regulate the power factor at its ac terminals by drawing lagging VArs as required such that the leading VArs drawn by the filter capacitor is at least partially (and most preferably, completely) cancelled thereby minimising the ac input current drawn by the combination of the filter and the power converter. If the ac terminals of the power converter are connected to the first distribution busbar then the power factor of the ac distribution current and voltage that is carried by the first distribution busbar and associated ac generator can be regulated accordingly. In practice, power factor control of the power converter can be employed for a number of purposes. In a second example, power factor may be adjusted to regulate the VArs flowing in the reactive impedances of the ac generator in order to influence the distribution voltages carried by the first and second distribution busbars. In a third example, power factor may be adjusted to regulate the power factor flowing in the ac generator in order to minimise the ac input current drawn from the ac generator.

In the case where the electrical load is a propulsion motor then power factor can be regulated even when a propulsive load is zero.

The power converter may also be controlled to regulate the harmonic distortion in the distribution voltages carried by the first and second distribution busbars. Any regulation of harmonic distortion will normally be for the purposes of reducing, or where possible eliminating, unwanted harmonic distortion or pollution in the respective distribution voltage that may arise from the operation of a propulsion motor or other electrical loads, for example. A low level of harmonic distortion implies a high QPS and vice versa. In a first example of harmonic control, the harmonic current components that are drawn by the power converter may be regulated so as to minimise the current total harmonic distortion (THD) in the ac lines of the power converter, thereby minimising the rms current drawn by the power converter. In practice, harmonic control of the power converter can be employed for a number of purposes. In a second example, the power converter may be regulated so as to reduce the current THD in the ac lines of the ac generator, thereby minimising the rms current drawn from the ac generator, taking into account any harmonic currents that may be present in the first distribution busbar as a result of sources of harmonic pollution other than the power converter—for example other electrical loads connected to the first distribution busbar. In a third example, the power converter may be regulated so as to minimise the voltage THD on the first or second distribution busbar.

Frequency and voltage stabilisation of the power distribution system may therefore be achieved by controlling the power converter to provide simultaneous regulation of the power flow through the power converter (power flow control), power factor (power factor control), and harmonic distortion (harmonic control) in the distribution voltages carried by the first and/or second distribution busbars. Frequency stabilisation of the distribution voltage in the second distribution busbar is derived from frequency stabilisation of the distribution voltage in the first distribution busbar or vice versa, either as a result of transformer coupling or the mutual coupling between the stator windings in a double or multiple output generator, although it would be more effective to stabilise the first distribution busbar because it would typically have a significantly greater power rating that the second distribution busbar in a situation where the first distribution busbar provides power to a propulsion drive system and the second distribution busbar provides power to ships services. In a conventional power distribution system any appropriate regulation of the distribution voltage carried by the first distribution busbar would automatically have an impact on the electrical quantities of the distribution voltage carried by the second distribution busbar as a result of transformer coupling. It is therefore important to understand that an aim of the power distribution system according to the present invention is to use a significant consumer of electrical power (i.e. the power converter) to affect the operation of an ac generator that forms part of the common power supply system, thereby allowing the regulation of electrical quantities in the first distribution busbar with the deliberate intention of achieving desired electrical quantities in the second distribution busbar. Such regulation allows the QPS on the second distribution busbar to be deliberately and purposefully regulated by the operation of the power converter.

The control of the power converter relies on the use of feedback signals that are provided to the controller. The feedback signals can include a first voltage feedback signal indicative of a voltage carried by the first distribution busbar and a second voltage feedback signal indicative of a voltage carried by the second distribution busbar. The feedback signals can also include a current feedback signal indicative of a current at ac terminals of the ac generator. In the case where the ac generator is a double or multiple output generator then the current feedback signal will be indicative of a current at the ac terminals that are associated with the relevant stator winding that supplies power to the distribution busbar to which the power converter is connected or to the power converter itself.

The present invention further provides a method of controlling a power distribution system comprising: first and second distribution busbars each carrying a respective distribution voltage, a common power supply system supplying power to the first and second distribution busbars, and a power converter connected to the first distribution busbar, the power converter having ac terminals, the method comprising the steps of: using feedback signals indicative of electrical quantities of the distribution voltages carried by the first and second distribution busbars to control the power converter to regulate electrical quantities at the ac terminals of the power converter and/or electrical quantities of the distribution voltage carried by the second distribution busbar.

The power converter can be controlled to regulate electrical quantities at the ac terminals of the power converter and electrical quantities of the distribution voltage carried by the second distribution busbar according to a compromise. A regulator switching or mixing function can be used.

The PWM strategy can be a field-oriented PWM strategy to enable the power factor and harmonic distortion in the distribution voltage carried by the first distribution busbar to be independently controlled while at the same time controlling the dc output voltage of the power converter. The PWM strategy may be varied continuously to enable the power converter to provide adaptive control, power regulation, and frequency and voltage stabilisation and support as required.

If a propulsion motor is connected to the power converter then the method can further comprise the step of controlling the propulsion motor to allow a dc link current to be adjusted independently of its shaft speed and torque of the propulsion motor.

Further technical features of the power distribution system are as described above.

Figure 1:
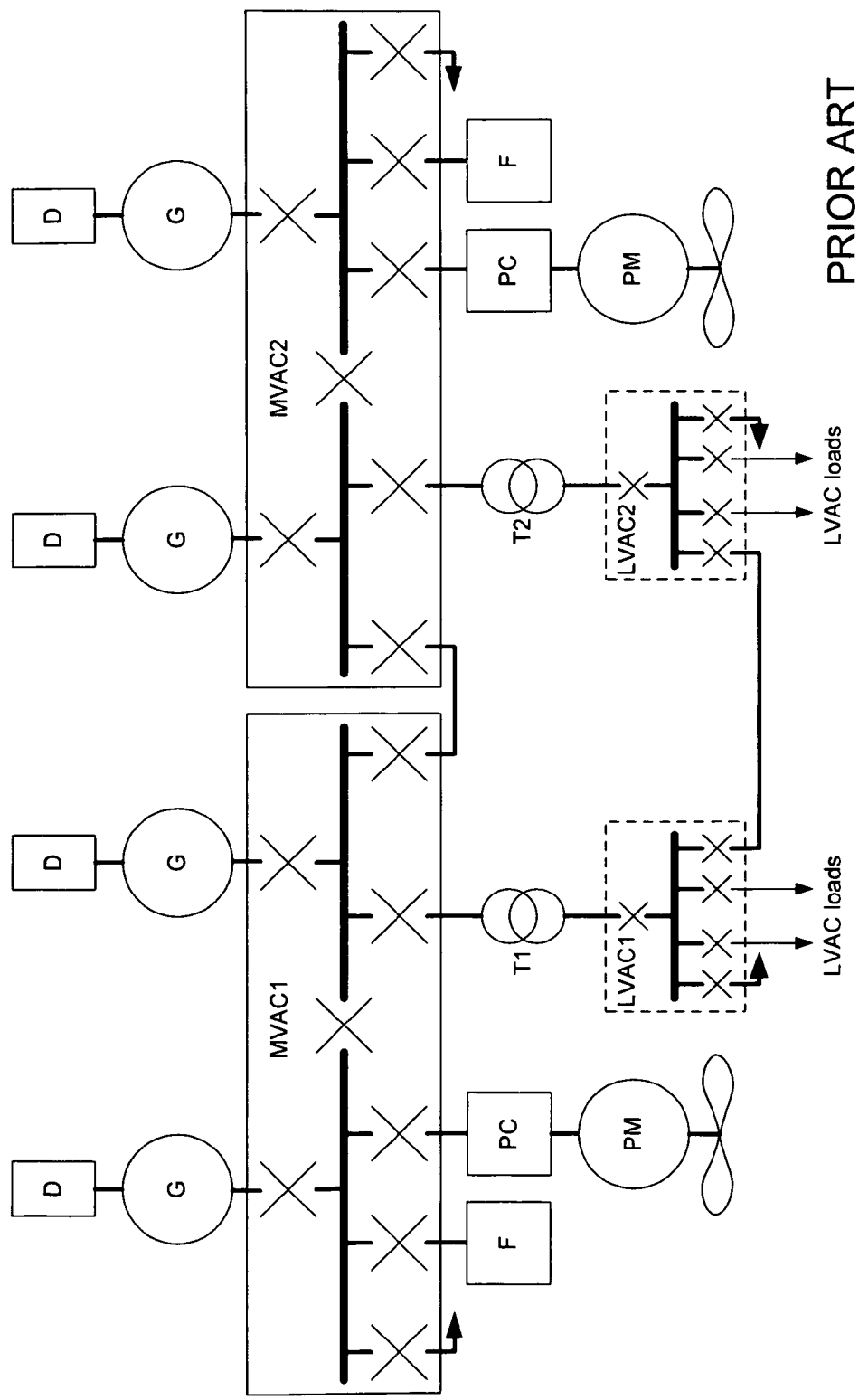
FIG. 1 is a schematic diagram of a conventional marine power distribution and propulsion system.
Figure 2:
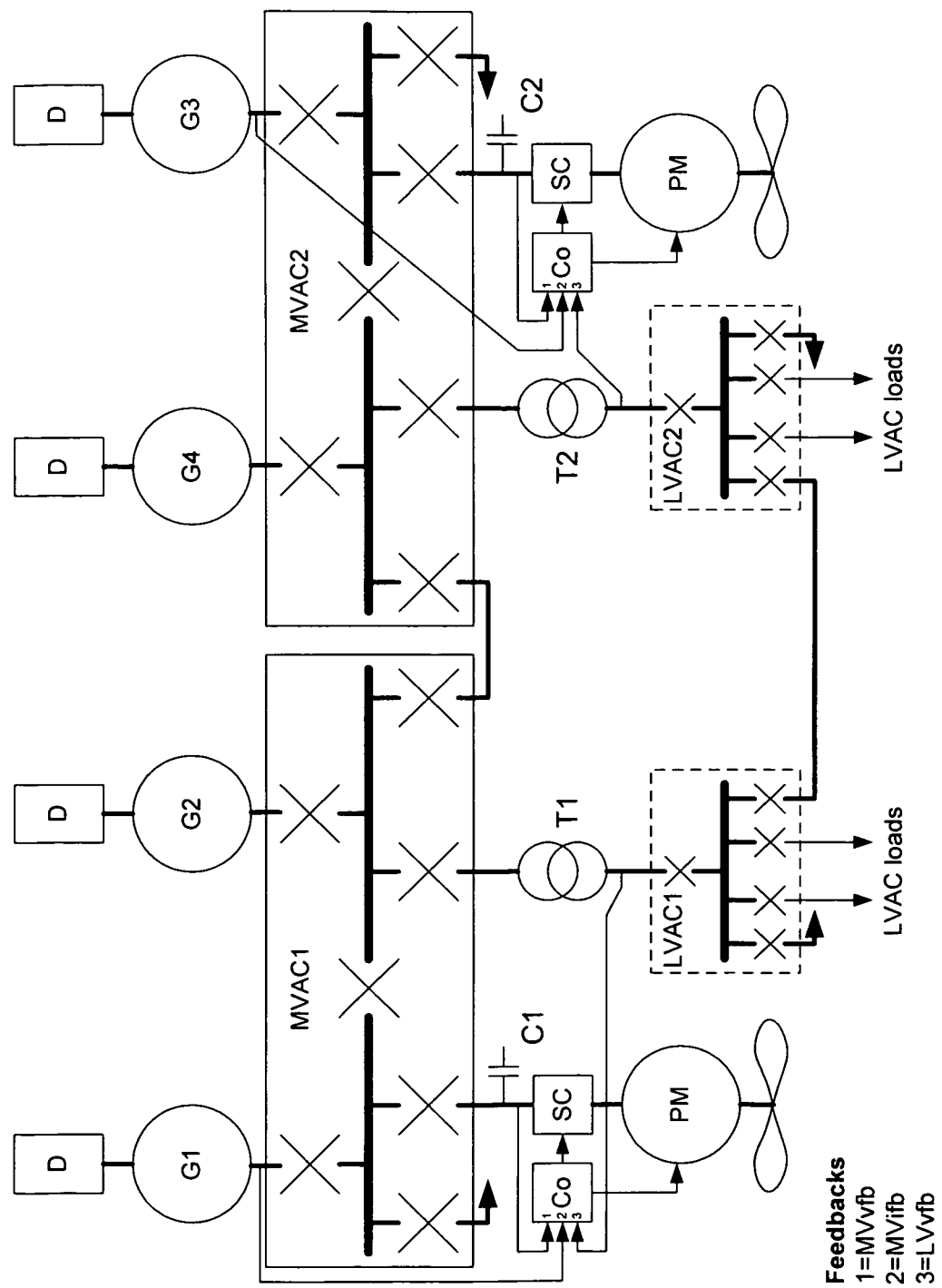
Figure 3:
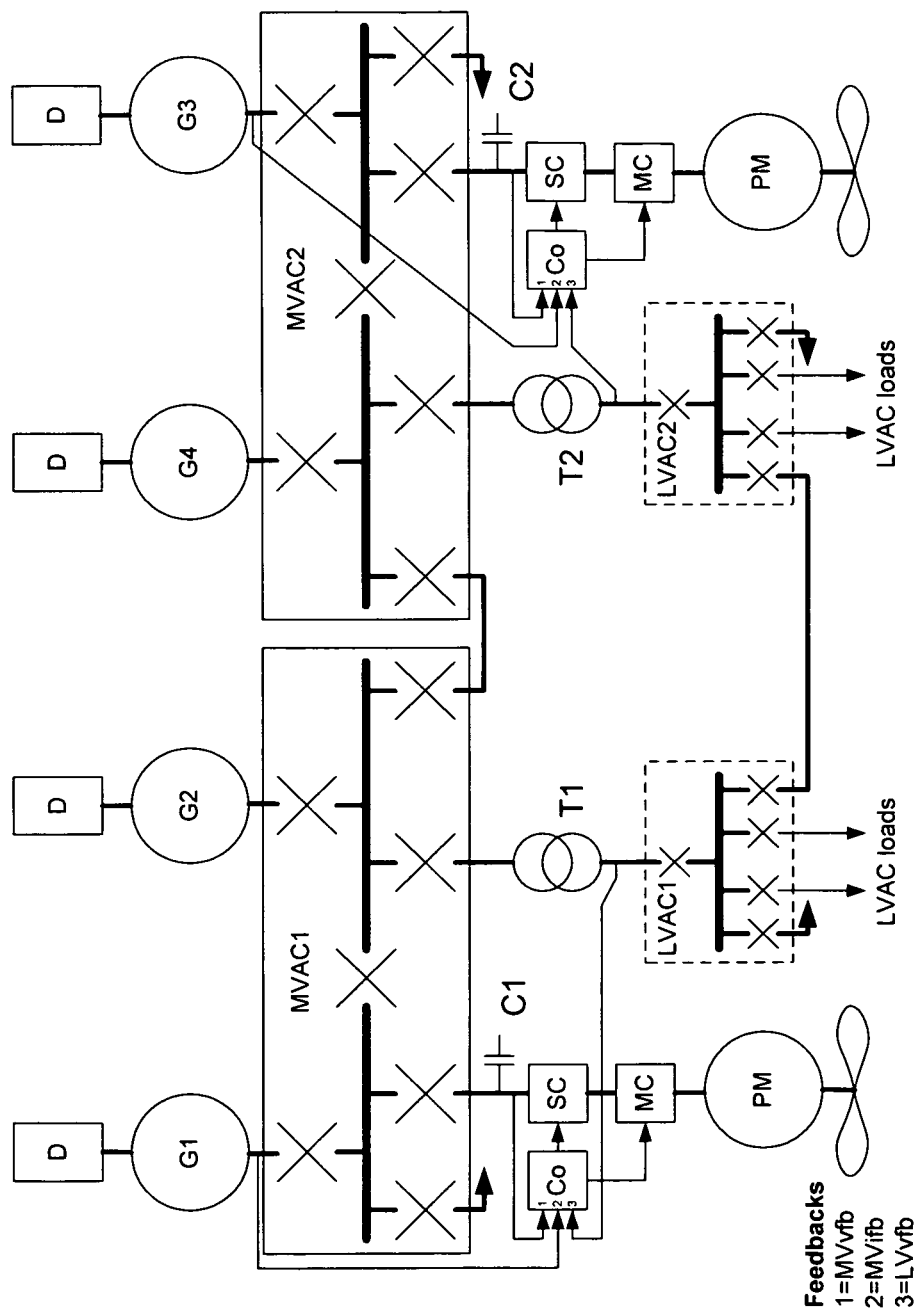
Figure 4:
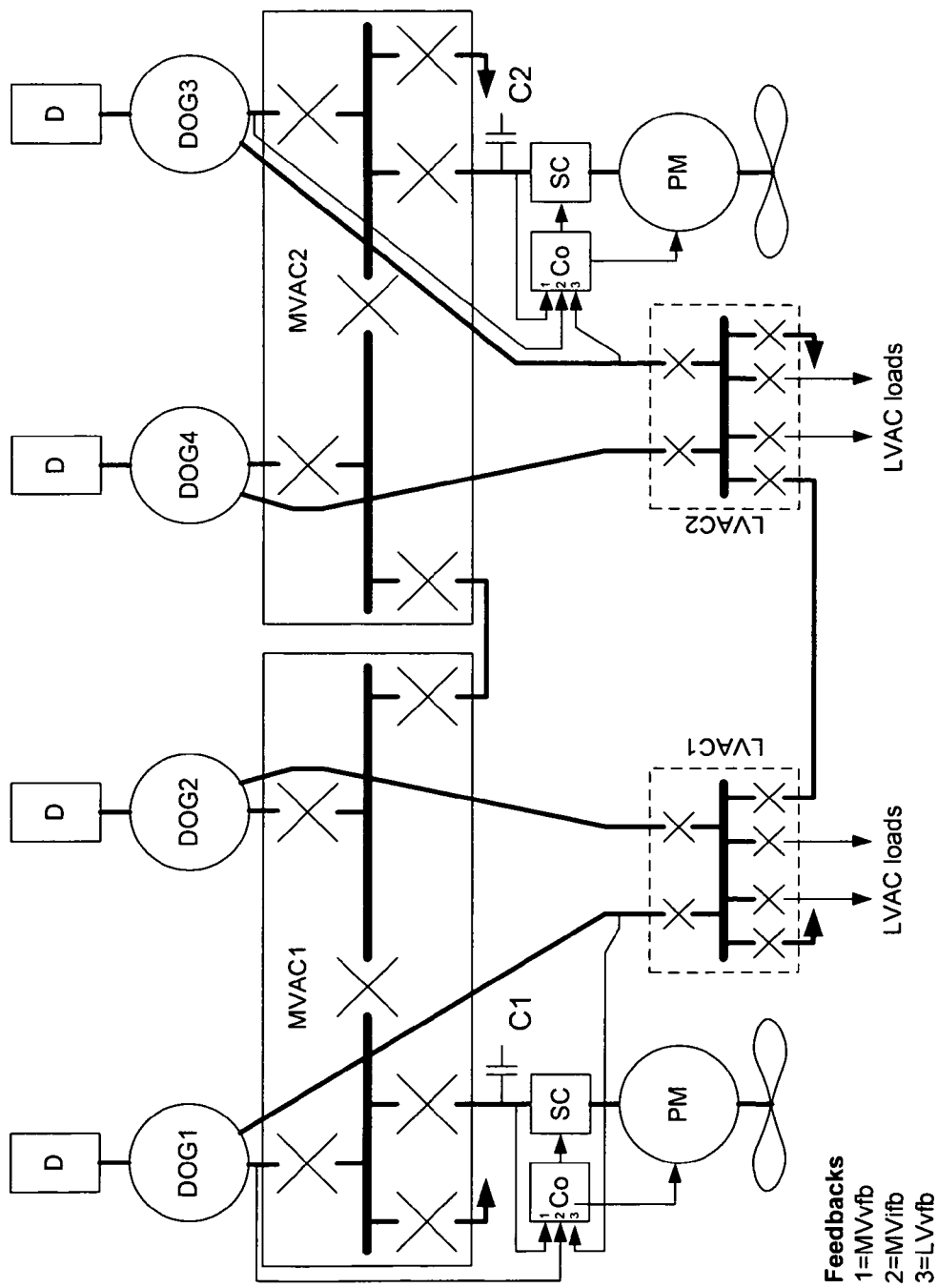
Figure 5:
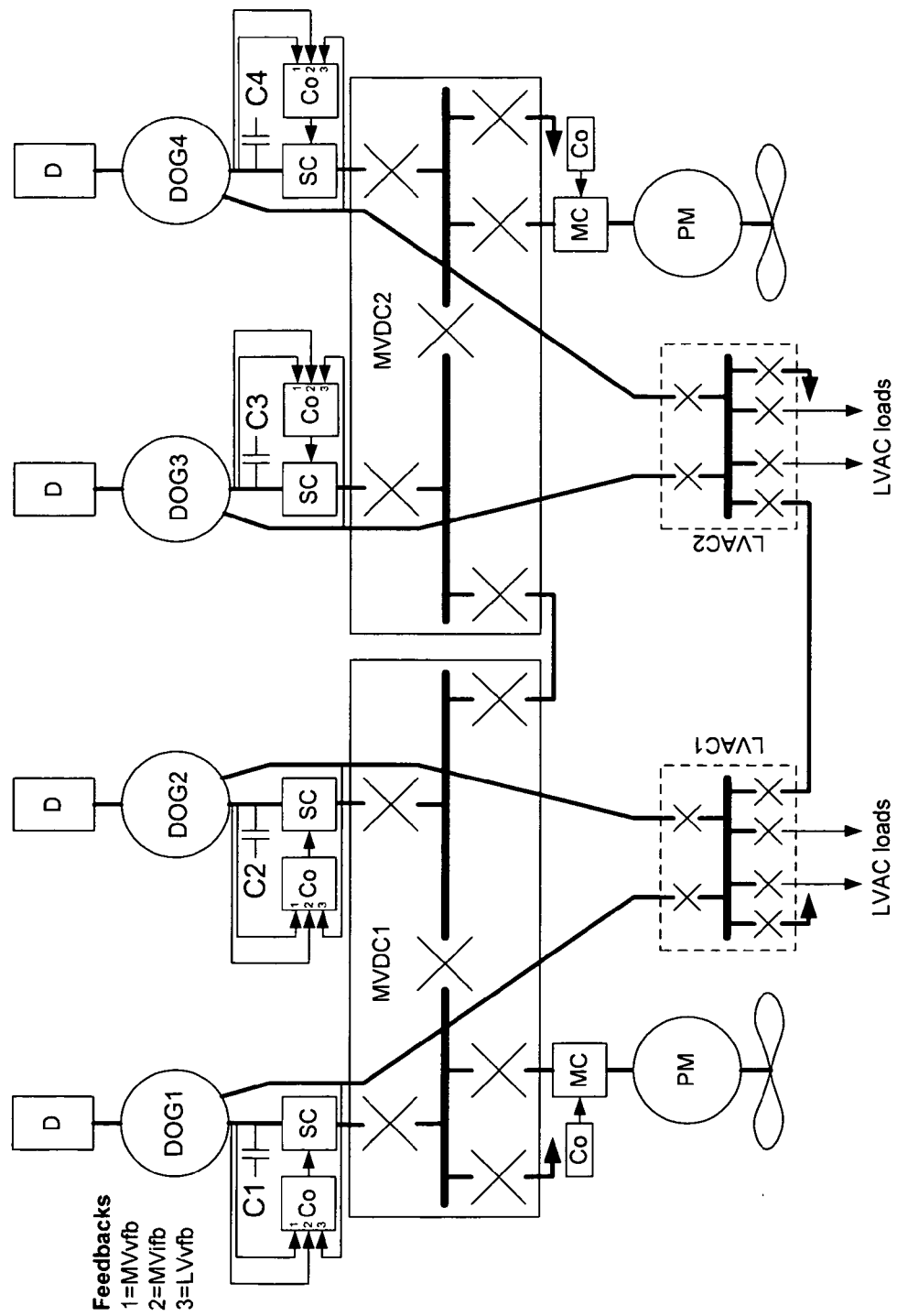
Figure 6:
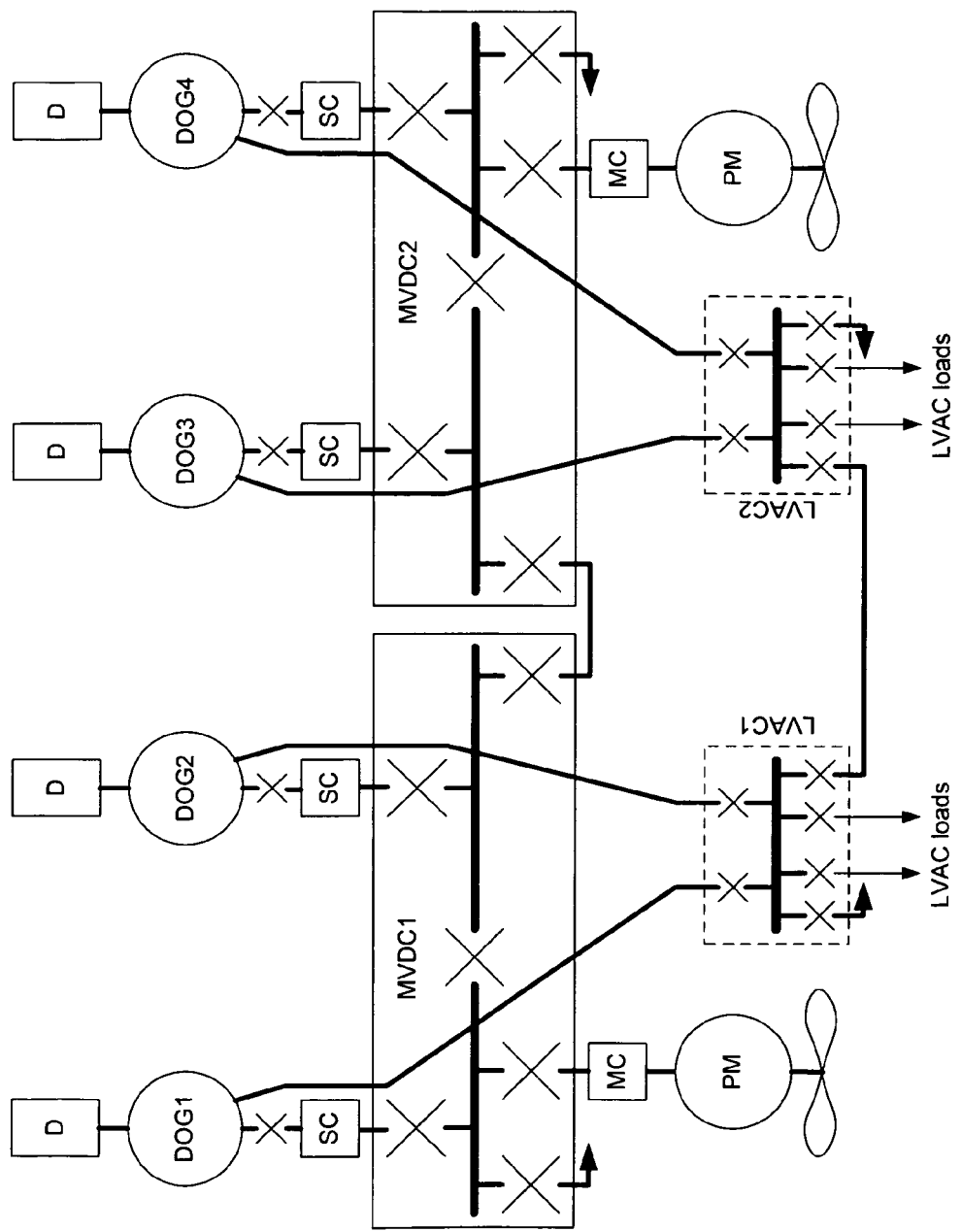
Figure 7:
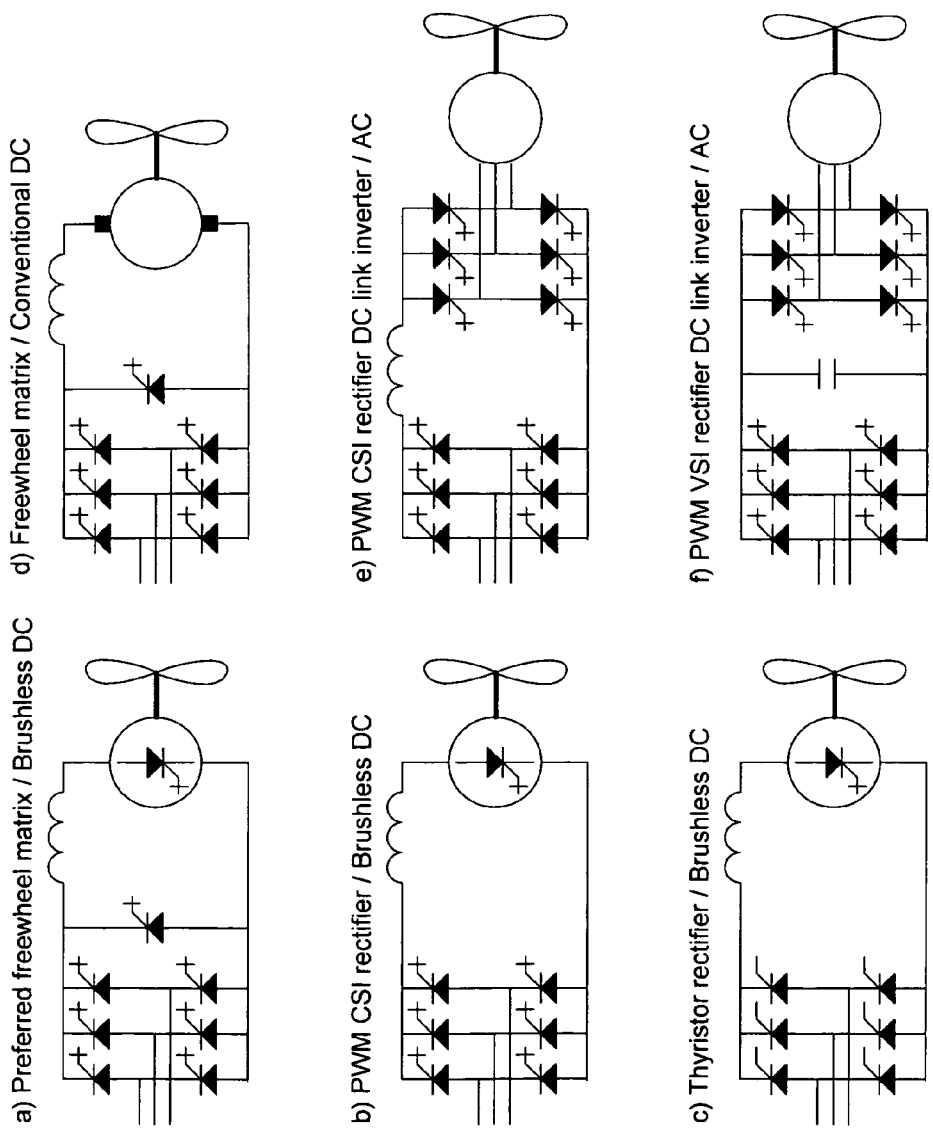
Figure 8:
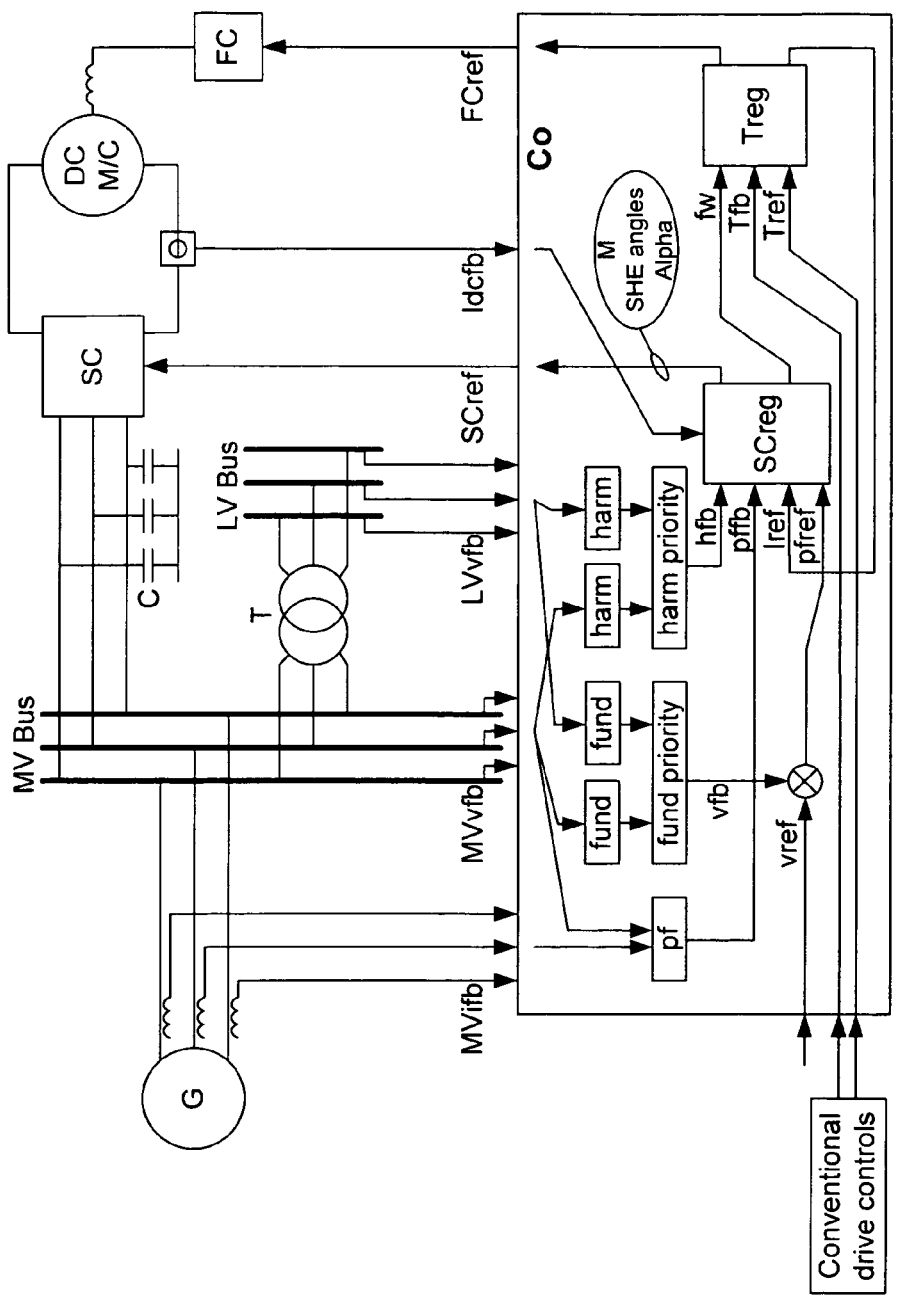
Figure 9:
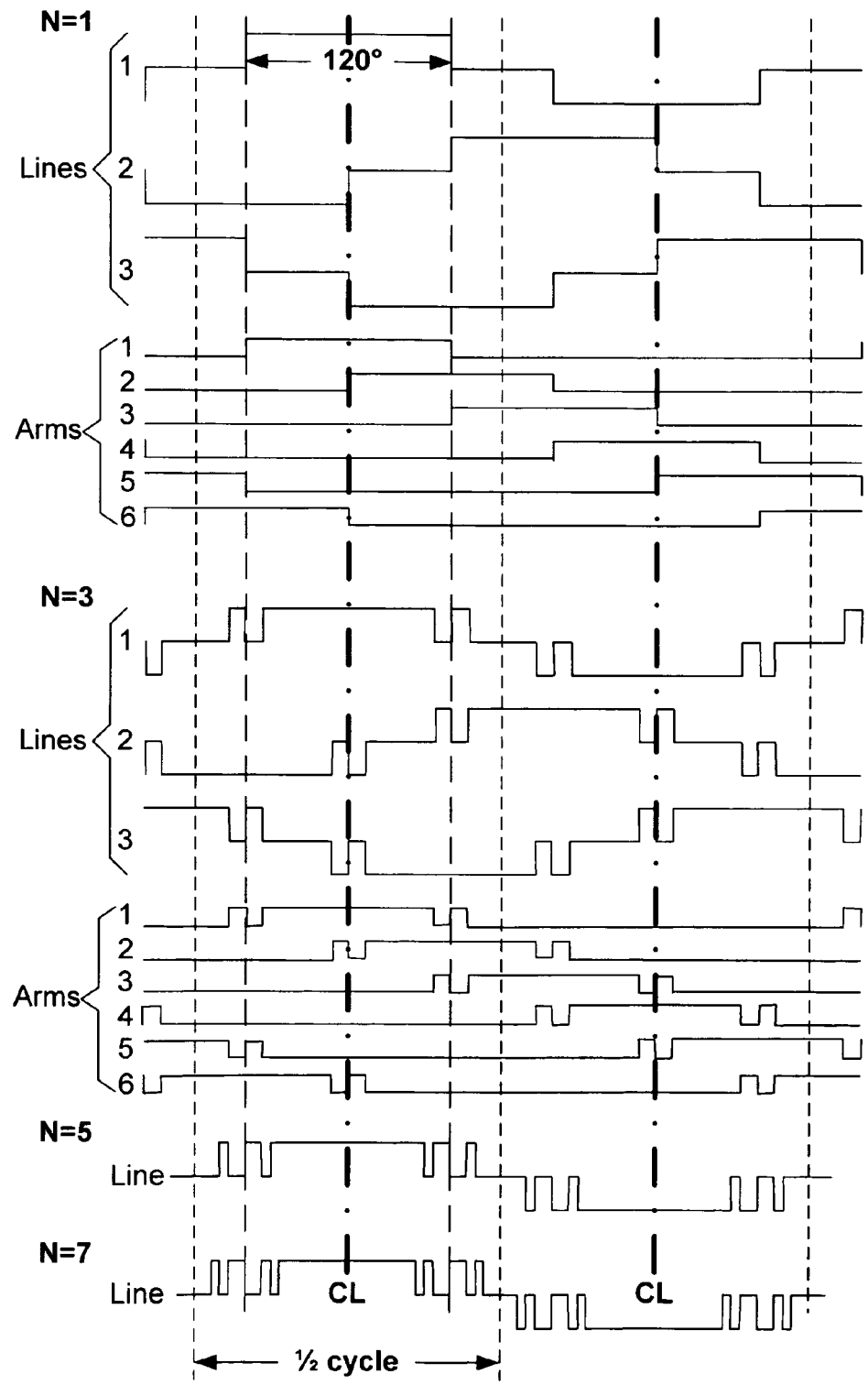

Exemplary embodiments of the invention will now be described with reference to the accompanying drawings, in which:

FIG. 2 is a schematic diagram of a marine power distribution and propulsion system in accordance with dc motor and transformer fed auxiliary supply embodiments of the present invention where the first distribution busbar carries an ac distribution voltage;

FIG. 3 is a schematic diagram of a marine power distribution and propulsion system in accordance with ac motor and transformer fed auxiliary supply embodiments of the present invention where the first distribution busbar carries an ac distribution voltage;

FIG. 4 is a schematic diagram of a marine power distribution and propulsion system in accordance with transformerless double output generator based embodiments of the present invention where the first distribution busbar carries an ac distribution voltage;

FIG. 5 is a schematic diagram of a marine power distribution and propulsion system in accordance with transformerless double output generator based embodiments of the present invention where the first distribution busbar carries a dc distribution voltage;

FIG. 6 is a schematic diagram of a marine power distribution and propulsion system in accordance with transformerless double output generator based embodiments of the present invention where the first distribution busbar carries a dc distribution voltage and the power converter is connected to the ac generator by a switched connection;

FIG. 7 is a schematic diagram showing a number of applicable power converter and propulsion motor arrangements;

FIG. 8 is a simplified schematic diagram of the control variables of the present invention; and FIG. 9 shows a series of PWM pulse sequences providing selective harmonic elimination (SHE) for active filtration purposes.

MARINE POWER DISTRIBUTION AND PROPULSION SYSTEM ARRANGEMENTS WHERE THE FIRST DISTRIBUTION BUSBAR CARRIES AN AC DISTRIBUTION VOLTAGE

Detailed Description of the Preferred Embodiments

FIG. 2 shows a first example of a marine power distribution and propulsion system in accordance with the present invention. A main diesel generator G1 and an auxiliary diesel generator G2 supply ac power to a first medium voltage switchboard or busbar MVAC1. In a similar manner, a main diesel generator G3 and an auxiliary diesel generator G4 supply ac power to a second medium voltage switchboard or busbar MVAC2. The medium voltage busbars carry a medium voltage (MV) distribution voltage (e.g. 6.6 kV, 60 Hz) and are equipped with protective switchgear. The protective switchgear comprises circuit breakers and associated controls and is represented in FIG. 2 by the × symbol. The medium voltage busbars MVAC1 and MVAC2 are interconnected by protective switchgear.

The first medium voltage busbar MVAC1 is divided into two separate sections that are interconnected by protective switchgear. The main diesel generator G1 is connected to one of the sections by protective switchgear and the auxiliary diesel generator G2 is connected to the other section by protective switchgear. In a similar manner, the second medium voltage busbar MVAC2 is divided into two separate sections that are interconnected by protective switchgear. The main diesel generator G3 is connected to one of the sections by protective switchgear and the auxiliary diesel generator G4 is connected to the other section by protective switchgear. The separate sections of each medium voltage busbar, and the first and second medium voltage busbars themselves, may therefore be selectively isolated from each other under certain operating conditions. Single and multiple island operation of the marine power distribution and propulsion system is therefore possible using an appropriate number of generators, medium voltage busbars and busbar sections.

First and second propulsion drive systems each include a rectifier (or supply converter) SC that is used to interface the medium voltage busbars MVAC1 and MVAC2 to a brushless dc propulsion motor PM that drives a propeller. The first and second propulsion drive systems also include an ac voltage line filter capacitor C1, C2 that provides passive filtering for the medium voltage busbars MVAC1 and MVAC2 and the associated rectifier SC.

A first low voltage switchboard or busbar LVAC1 is connected to the first medium voltage busbar MVAC1 through a first transformer T1. A second low voltage switchboard or busbar LVAC2 is connected to the second medium voltage busbar MVAC2 through a second transformer T2. The low voltage busbars LVAC1 and LVAC2 are interconnected by protective switchgear.

The low voltage busbars LVAC1 and LVAC2 carry a low voltage (LV) distribution voltage (e.g. 440 V, 60 Hz) and a number of unspecified loads such as ships service distribution systems (labelled LVAC loads) are connected to the low voltage busbars. In this way, the LV distribution voltage is conveniently derived from the MV distribution voltage by the use of appropriate transformers T1 and T2.

The rectifiers SC may be of any suitable type as described in more detail below with reference to FIG. 7.

The rectifiers SC of the first and second propulsion drive systems are operated in accordance with a control strategy to enable them to provide active filtering and static compensation in addition to regulating the power flow to the dc propulsion motors PM. In practice, each propulsion drive system (e.g. port and starboard) will incorporate a PWM controller Co that regulates its respective rectifier SC functions simultaneously so as to satisfy the primary requirement for power flow control and the additional requirements of power factor and harmonic control. The PWM controllers Co may operate independently or in a coordinated manner. In the power distribution systems shown in FIGS. 2 to 4 each PWM controller Co receives three-phase ac input signals, namely MV voltage feedback signal MVvfb, MV current feedback signal MVifb and LV voltage feedback signal LVvfb which are used to select or vary the modulation depth, modulation angle and harmonic structure of the PWM strategy that is applied to the rectifier SC. The MV voltage feedback signal MVifb is taken only from a single generator in each case but other configurations are possible. The control strategies employed by each PWM controller Co are described in more detail below with reference to FIG. 8.

FIG. 3 shows a second example of a marine power distribution and propulsion system in accordance with the present invention. The system is identical to that shown in FIG. 2 with the exception that the first and second propulsion drive systems each include a rectifier SC and an active inverter (or machine converter) MC that are used to interface the medium voltage busbars MVAC1, MVAC2 to an ac propulsion motor PM that drives a propeller. Each rectifier SC is connected to the associated active inverter MC by a dc link and may be of any suitable type as described in more detail below with reference to FIG. 7. The inverter MC can be in the form of a variable speed drive.

The rectifiers SC and inverters MC are operated in accordance with a control strategy to enable them to provide active filtering and static compensation in addition to regulating the power flow to the ac propulsion motors PM. The PWM controllers Co are used to regulate the respective rectifier and inverter functions.

FIG. 4 shows a third example of a marine power distribution and propulsion system in accordance with the present invention. In the systems of FIGS. 2 and 3, the LV distribution voltage is derived from the MV distribution voltage by the use of appropriate transformers T1 and T2. In contrast to this, the system of FIG. 4 uses double output generators (DOGs) that have a plurality of galvanically-isolated multi-phase stator windings, each stator winding being connected to an independent load.

A main diesel double output generator DOG1 and an auxiliary diesel double output generator DOG2 supply ac power to a first medium voltage switchboard or busbar MVAC1 from one of their stator windings and supply ac power to a first low voltage switchboard or busbar LVAC1 from their other stator winding. In a similar manner, a main diesel double output generator DOG3 and an auxiliary diesel double output generator DOG4 supply ac power to a second medium voltage switchboard or busbar MVAC2 from one of their stator windings and supply ac power to a second low voltage switchboard or busbar LVAC2 from their other stator winding. If additional medium voltage or low voltage busbars are provided then each busbar (or busbar section) will typically be connected to a stator winding of a multiple output generator.

The double output generators provide galvanic isolation between their MV and LV outputs. The extremely effective mutual coupling between the stator windings of the double output generator leads to some performance benefits when compared to the transformer-based systems shown in FIGS. 2 and 3. The mutual coupling causes the per unit reactive voltage drop that is experienced in the stator windings of each double output generator to be almost identical. This has the effect of reducing the compromise between regulation of the medium and low voltage busbars. The reduction extends to harmonic frequencies and for all practical purposes the per unit harmonic voltage spectra of the medium and low voltage busbars are almost identical. Consequently, active filtration does not strictly need to provide any prioritisation of medium and low voltage busbar feedback and only a single voltage feedback source is normally needed. Nevertheless, the switching and mixing functions described herein permit the prioritisation of busbar voltage feedbacks in order to permit closed-loop control to counter any disparity between the reactive voltage drops of the respective stator windings. In addition to the simplification of the control strategy, the requirement for a transformer between the medium and low voltage busbars is eliminated, thereby improving efficiency of the overall marine power distribution and propulsion system while at the same time reducing noise, vibration, machinery volume and mass.

Although the first and second propulsion drive systems shown in FIG. 4 each include a rectifier SC that is used to interface the medium voltage busbars to a brushless dc propulsion motor PM that drives a propeller, it will be readily appreciated that each of the first and second propulsion drive systems can include a rectifier and an inverter for interfacing the medium voltage busbars to an ac propulsion motor. The power converters may be of any suitable type as described in more detail below with reference to FIG. 7.

Although the power distribution systems shown in FIGS. 2 to 4 only have two propulsion drive systems, it will be readily appreciated that any number of propulsion drive systems can be provided depending on the particular power distribution system and that the various regulation and control processes can be adapted accordingly.

Marine Power Distribution and Propulsion System Arrangements where the First Distribution Busbar Carries a Dc Distribution Voltage:

FIG. 5 shows a fourth example of a marine power distribution and propulsion system in accordance with the present invention. In the systems of FIGS. 2 to 4 the first and second medium voltage busbars MVAC and MVAC2 carry an ac distribution voltage. The first and second low voltage busbars LVAC1 and LVAC2 carry an ac distribution that is either derived from the MV distribution voltage by the use of appropriate transformers T1 and T2 (FIGS. 2 and 3) or by means of mutual coupling between the stator windings of the double output generators (FIG. 4). The system of FIG. 5 also uses double output generators but the first and second medium voltage switchboards or busbars MVDC1 and MVDC2 carry a dc distribution voltage (e.g. 5.0 kV).

A main diesel double output generator DOG1 and an auxiliary diesel double output generator DOG2 supply ac power to a first low voltage switchboard or busbar LVAC1 from one of their stator windings. The other of their stator windings is connected to a first medium voltage switchboard or busbar MVDC1 by means of a rectifier (supply converter) SC. In a similar manner, a main diesel double output generator DOG3 and an auxiliary diesel double output generator DOG4 supply ac power to a second low voltage switchboard or busbar LVAC2 from one of their stator windings. The other of their stator windings is connected to a second medium voltage switchboard or busbar MVDC2 by means of a rectifier (supply converter) SC. Although the first and second low voltage busbars LVAC1 and LVAC2 carry an ac distribution voltage, it will be readily appreciated that a rectifier could also be used to connect the relevant stator winding of each double output generator to the first and second low voltage busbars if there was a requirement for them to carry a dc distribution voltage.

AC voltage line filter capacitors C1-C4 provide passive filtering for the associated rectifiers SC.

The first and second propulsion drive systems each include an active inverter (or machine converter) MC that is used to interface the medium voltage busbars MVDC1, MVDC2 to an ac propulsion motor PM that drives a propeller. The inverter MC can be a variable speed drive.

The rectifiers SC are operated in accordance with a control strategy to enable them to provide active filtering and static compensation in addition to regulating the power flow to the first and second medium voltage busbars MVDC1 and MVDC2. The PWM controllers Co are used to regulate the respective rectifier and inverter functions.

The power converters may be of any suitable type as described in more detail below with reference to FIG. 7.

FIG. 6 shows a fifth example of a marine power distribution and propulsion system in accordance with the present invention. In the system of FIG. 5 the rectifiers SC are connected directly to the relevant stator winding of the double output generators. In the system of FIG. 6 the rectifiers are connected to the relevant stator winding of the double output generators by means of protective switchgear comprising circuit breakers and associated controls. The purpose of such additional protective switchgear is to interrupt fault currents that might be fed into the first and second medium voltage busbars MVDC1 and MVDC2 in the event of a rectifier or associated control malfunction, for example. It will be noted that the PWM controllers Co, filter capacitors and control circuitry have been omitted from FIG. 6 to improve clarity.

Power Converter Arrangements:

FIG. 7 shows some possible arrangements for the power converters used in the propulsion drive systems of FIGS. 2 to 4. In each of the six example power circuits shown in FIGS. 7a) to f) a dc link filter inductor or capacitor is connected between a rectifier (on the left side of the filter) and the associated propulsion motor (on the right side of the filter). The rectifier performance attributes for a variety of power converter/dc propulsion motor arrangements and power converter/ac propulsion motor arrangements are summarised in Tables 1 and 2, respectively.

TABLE 1

| Propulsion motor | Power converter | Rectifier attributes | |
|---|---|---|---|
| Brushless dc | Matrix converter employing a freewheel path (e.g. as described in WO 2006/064279) FIG. 7a) | PWM strategy | Yes |
| | | Power flow control | Yes |
| | | Power factor control | Yes |
| | | Harmonic control | Yes |
| | | Low power losses | Yes |
| | | Ground currents | Low |
| | | Brushless | Yes |
| | PWM CSI rectifier FIG. 7b) | PWM strategy | Yes |
| | | Power flow control | Yes |
| | | Power factor control | Yes |
| | | Harmonic control | Yes |
| | | Low power losses | No |
| | | Ground currents | Low |
| | | Brushless | Yes |
| | Thyristor rectifier FIG. 7c) | PWM strategy | No |
| | | Power flow control | Yes |
| | | Power factor control | Yes - limited |
| | | Harmonic control | No |
| | | Low power losses | Yes |
| | | Ground currents | Low |
| | | Brushless | Yes |
| Conventional dc | Matrix converter employing a freewheel path FIG. 7d) | PWM strategy | Yes |
| | | Power flow control | Yes |
| | | Power factor control | Yes |
| | | Harmonic control | Yes |
| | | Low power losses | Yes |
| | | Ground currents | Low |
| | | Brushless | No |

TABLE 2

| Propulsion motor | Power converters | Rectifier attributes | |
|---|---|---|---|
| Conventional ac | PWM CSI rectifier - dc link inverter FIG. 7e) | PWM strategy | Yes |
| | | Power flow control | Yes |
| | | Power factor control | Yes |
| | | Harmonic control | Yes |
| | | Low power losses | No |
| | | Ground currents | Low |
| | | Brushless | Yes |
| | Thyristor rectifier - dc link inverter (e.g. load commutated inverter (LCI) Not shown but similar to FIG. 7e) | PWM strategy | No |
| | | Power flow control | Yes |
| | | Power factor control | Yes - limited |
| | | Harmonic control | No |
| | | Low power losses | No |
| | | Ground currents | Low |
| | | Brushless | Yes |
| | PWM VSI rectifier - dc link inverter FIG. 7f) | PWM strategy | Yes |
| | | Power flow control | Yes |
| | | Power factor control | Yes - limited |
| | | Harmonic control | Yes |
| | | Low power losses | No |
| | | Ground currents | High |
| | | Brushless | Yes |

The power converters that are used in the systems of FIGS. 5 and 6 are similar to those described above with reference to FIGS. 7a) to f) but instead of the ac terminals of the rectifiers being connected to an ac distribution busbar the ac terminals are connected to the ac terminals of an ac generator and the dc output voltage of the rectifiers is used to supply power to a dc distribution busbar. The rectifier performance attributes within Tables 1 and 2 are equally applicable to the rectifiers of dc distribution systems such as those shown in FIGS. 5 and 6. In particular, the rectifiers shown in FIGS. 7a) to f) can all regulate power flow to provide the desired substantially constant dc distribution voltage, but only the rectifiers shown in FIGS. 7c) to e) can limit their output voltages to less than the crest of the generator ac line voltage and thereby provide fault current and short circuit protection. The rectifier of FIG. 7f) is reliant upon the protective capability of its associated switchgear.

When it is necessary for the brushless dc or conventional dc propulsion motors of FIGS. 7a) to d) to draw power from a dc distribution busbar, an interposing dc/dc power converter must be used to convert the dc distribution voltage that is carried by the dc distribution busbar to a dc voltage that is suitable for dc motor drive operation. Since such dc motor drive equipment has an armature voltage that is approximately proportional to shaft speed, the interposing dc/dc power converter must be of the well known buck converter type to facilitate variable speed operation.

When it is necessary for a propulsion motor to draw power from a dc distribution busbar an inverter must be employed to convert the dc distribution voltage that is carried by the dc distribution busbar to an ac voltage that is suitable for ac motor drive operation. Only the inverter of FIG. 7f) is suitable for direct connection to a dc distribution busbar that carries a substantially constant voltage. Such an inverter motor drive system is inherently capable of variable speed operation.

Control Strategies:

The primary function of each rectifier SC (and inverter MC, where appropriate) is to control the power flow to its associated propulsion motor PM (FIGS. 2 to 4) or to the first and second medium voltage busbars MVDC1 and MVDC2 (FIGS. 5 and 6) and this is achieved by selecting or varying the modulation depth of the PWM strategy that is applied to the rectifier. Power factor control and harmonic control can be achieved by selecting or varying the modulation angle and harmonic structure, respectively, of the PWM strategy that is applied to the rectifier SC.

With regard to power factor control, it will be readily appreciated that in the case of the systems shown in FIGS. 2 to 4 the capacitors C1, C2 will draw leading MVArs from the diesel generators. The modulation angle of the PWM strategy applied to each rectifier SC can therefore be selected or varied by the PWM controller Co such that the rectifiers draw lagging MVArs as required to compensate for the leading MVArs drawn by the filter capacitors C1, C2 to achieve as close a unity power factor, or any other desired power factor, as possible. The filter capacitors C1-C4 in the system of FIG. 5 will also draw leading MVArs from the diesel generators and the associated rectifiers SC can be controlled in a similar manner.

The gain of the power factor control strategy can be set to allow the first and second propulsion drive systems to contribute equally or individually to static compensation. The filter capacitors C1, C2 of the first and second propulsion drive systems draw leading MVArs whenever they are connected to the respective medium voltage busbars MVAC1 and MVAC2. This MVAr rating is determined when the power distribution system is designed and is the result of an optimisation process that takes into account the requirement to avoid over-excitation of generators when operating at no load, when filter capacitors C1, C2 are on-line and are not regulated by the rectifiers SC, the worst case for the systems shown in FIGS. 2 to 4 being the connection of the first and second filter capacitors to only a single generator. A further consideration in the optimisation process is the requirement for rectifiers SC to draw reactive current in order to moderate the reactive current of the filter capacitors C1, C2 in order to control and regulate power factor. The rectifiers SC may be designed to draw lagging and/or leading reactive current, but this capability has an equipment total MVA rating and associated cost implications. Once the capacitance of the filter capacitors C1, C2 has been determined, the in-service MVAr of the filter capacitors is proportional to the ac input voltage squared multiplied by the ac input frequency.

The PWM controller Co does not need to know the value of leading MVArs drawn by the filter capacitors C1, C2 at any one time because the closed-loop control is based on feedback signals that are taken from the ac generators. If identical generators are employed in the power distribution system then the power factor control and regulation that is applied to one or both of the rectifiers SC is equally effective to all generators when operating in a single island mode. In the event that different generators are employed then their reactances may not be balanced and power factor control must be carried out according to a compromise when the generators are operating in a single island mode. Although not shown in FIG. 8 (as discussed below), it is possible to cross couple current feedback from the first generator into the second rectifier SC, and vice versa, to provide redundancy.

FIG. 8 shows a possible control system for selecting or varying the PWM strategy to provide power flow control, power factor control and harmonic control. Such a control system is capable of regulating the QPS of the MV and LV distribution voltages for the systems shown in FIGS. 2 to 4. The control system is simplified with only a single generator G and a single propulsion drive system being shown. The propulsion drive system includes an ac voltage line filter capacitor C and a rectifier SC that is connected to a conventional dc motor DC M/C via a dc link. The dc motor DC M/C includes a field converter FC. A PWM controller Co corresponds to the controllers shown in FIGS. 2 to 4 and is associated with the propulsion drive system. It will be readily appreciated that multiple generators and propulsion drive systems may be employed in practice and that MV current feedback signals MVifb may be provided from more than one generator G. Analogue or digital control implementations are equally applicable.

The PWM controller Co provides output signals SCref and FCref to the rectifier SC and the field converter FC, respectively. It will be readily appreciated that the output signal FCref could equally be applied to the armature converter or electrical commutator circuit described in EP 1798847 in order to regulate the dc terminal voltage/current relationship. Alternatively, the output signal FCref could be applied to current source inverters or voltage source inverters of all types associated with ac motor drives to regulate their dc terminal voltage/current relationship. This is shown in FIG. 3 where each propulsion drive system includes an inverter MC.

The output signal SCref comprises PWM reference signals: modulation depth M, selective harmonic elimination angles "SHE angles" and firing delay angle "Alpha" which determines the modulation angle of the PWM strategy that is applied to the rectifier SC of the propulsion drive systems.

The PWM controller Co receives input signals comprising three-phase ac feedback signals (i.e. MV current feedback signal MVifb, MV voltage feedback signal MVvfb and LV voltage feedback signal LVvfb), a dc link current feedback signal Idcfb, a voltage reference signal vref, a torque feedback signal Tfb and a torque reference signal Tref. Although marine power system distribution bus voltage regulation is normally a function of an automatic voltage regulator (AVR) that is associated with each generator and an associated power management system (PMS), the control system of the present invention includes the capability to adjust the power factor of ac input current drawn by the rectifier SC in order to assist the AVR in regulating the fundamental component of a distribution bus voltage and as such may receive the voltage reference signal vref from any of: (i) the AVR, (ii) the PMS, or (iii) an external source. The voltage reference signal vref is summated with a voltage feedback signal vfb in order to determine voltage error signal which is used as a power factor reference signal pfref for the rectifier regulator SCreg. The torque signals Tfb and Tref are derived by conventional drive controls. For example, a conventional drive controller may be provided with a shaft speed control system whose output is the torque reference signal Tref for the torque regulator Treg, the objective being for the torque regulator to cause sufficient torque to be developed by the drive system to allow it to attain a shaft speed that is in agreement with the requirements of the speed control system. In order to achieve closed-loop torque control, the torque regulator Treg requires a torque feedback signal Tfb and this may be derived from a torque transducer or calculated using known methods from armature current (derived from current feedback signal Idcfb), armature current position (not shown in FIG. 8) and field current (derived from output signal FCref). In practice, a number of different methods of deriving the torque signals Tfb and Tref are known and it would be possible to integrate them with the PWM controller Co.

Any suitable number of the three-phase ac feedback signals can be employed in conjunction with a switching or mixing function to allow other generators to be controlled.

A torque regulator Treg produces a dc link current reference signal Iref in order to correct the difference between the torque reference signal Tref and the torque feedback signal Tfb. A field weakening signal fw is provided to the field converter FC (or armature converter, electronic commutator, current source inverter, or voltage source inverter in the case of other motor types) from a rectifier regulator SCreg to allow the field converter to reduce the dc link voltage. However, the response of the field weakening control is moderated by the torque regulator Treg in order to prioritise power flow control. The field weakening signal fw is therefore a request signal while the output signal FCref is an absolute demand.

The primary function of the rectifier regulator SCreg is to correct the difference between the current reference signal Iref and the current feedback signal Idcfb in order to satisfy the requirements of the torque regulator Treg. The rectifier regulator SCreg also receives power factor and harmonic feedback signals pffb and hfb and uses these to control power factor and harmonic structure, respectively. These secondary functions of the rectifier regulator SCreg are described in more detail after the following description of the associated feedback processing functions. The regulator and feedback processing functions are described separately to improve clarity but it will be readily appreciated that they are likely to be integrated in practice, particularly when a digital regulator with nested dq loops (one dq loop per harmonic frequency) is employed.

The PWM controller Co incorporates a power factor estimation function block pf that receives the MV current feedback signal MVifb and the MV voltage feedback signal MVvfb and provides a power factor feedback signal pffb which is the measured angle between the input signal vectors. The power factor estimation function block pf may use any suitable estimation function process or technique.

The PWM controller Co incorporates at least one fundamental (harmonic order 1) estimation function block labelled "fund", each having a three-phase voltage feedback signal according to the quantity to be regulated. More particularly, a first fundamental estimation function block for estimating the fundamental voltage component of the medium voltage busbars MVAC1 and MVAC2 may receive a MV voltage feedback signal MVvfb while a second fundamental estimation function block for estimating the fundamental voltage component of the low voltage busbars LVAC1 and LVAC2 may receive a LV voltage feedback signal LVvfb.

If more than one fundamental estimation function block is used then the resultant data is prioritised by a switching or mixing function labelled "fund priority" whose output is a voltage feedback signal vfb. The fundamental estimation function block(s) may use any suitable estimation function process or technique and be combined with the harmonic estimation function block that is described below.

The PWM controller Co also incorporates at least one harmonic estimation function block labelled "harm", each having a three-phase voltage feedback signal according to the quantity to be regulated. More particularly, a first harmonic estimation function block for estimating the harmonic distortion in the medium voltage busbars MVAC1 and MVAC2 may receive a MV voltage feedback signal MVvfb while a second harmonic estimation function block for estimating the harmonic distortion in the low voltage busbars LVAC1 and LVAC2 may receive a LV voltage feedback signal LVvfb. Each harmonic estimation function block identifies the magnitudes and angles of the most significant voltage harmonics, which in practice will normally be the lower order integer harmonics. Since the harmonic estimation function block may have an inherent capability to estimate the magnitude of the fundamental component of a harmonic spectrum, this function block may be used to output data as a replacement for the fundamental estimation function block in some circumstances. The higher order harmonics are less significant in control terms because they are passively filtered by the ac voltage line filter capacitor C. This passive filtration may also benefit from passive damping components.

If more than one harmonic estimation function block is used then the resultant data is prioritised by a switching or mixing function labelled "harm priority". The harmonic estimation function block(s) may use any suitable estimation function process or technique.

The functions of the rectifier regulator SCreg and their interdependencies will now be briefly described. Closed-loop control of the dc link current (i.e. power flow control) is performed mainly by adjusting the modulation depth M of the PWM strategy that is applied to the rectifier SC by the PWM controller Co. Closed-loop control of power factor is performed by adjusting the modulation angle of the PWM strategy by adjusting the firing delay angle "Alpha", but this action will also have an impact on the current control because the firing delay angle "Alpha" is approximately zero when the MV current feedback signal MVifb and the MV voltage feedback signal MVvfb are in phase and any departure from this angle causes the dc link voltage to reduce. As a result, the closed-loop control of the dc link current is modified by outputting the field weakening signal fw, thereby causing the torque regulator Treg to demand increased dc link current by means of the current reference signal Iref. Thus, the power factor regulator function within the rectifier regulator SCreg is prioritised over the current regulator function, but the overriding nature of the torque regulator Treg allows the overall prioritisation of power flow regulator functions.

Closed-loop control of distribution bus voltage may be achieved by regulating power factor in response to a voltage error signal which is employed as the power factor reference signal pfref. If such closed-loop voltage control is not required the power factor reference signal pfref is ignored and an internal default power factor reference equivalent to unity power factor is employed. If such closed-loop voltage control is required the power factor reference signal pfref is summated with the internal default power factor reference, i.e. the closed-loop voltage control function applies an offset to the internal default reference.

Closed-loop control of the harmonic structure of the PWM strategy is performed by appropriate selection of pulse number and pulse width, these variables having relatively minor impact on the power flow and power factor regulator functions. In any event, the power flow and power factor regulator functions are corrected by the closed-loop action of the torque regulator Treg and the closed-loop action of the power factor regulator function which acts directly on the phase position of the sequence of PWM pulses, respectively. A number of PWM strategies for active filtration are known any convenient process or technique may be employed. One appropriate technique is to use current source half wave symmetrical synchronous modulation where an integer odd number N of pulses of dc link current are injected into a particular pair of ac voltage lines per half cycle. The pulse sequences are symmetrical about the centre of the half cycle (i.e. one pulse is equi-spaced about the centre, (N−1)/2 pulses are disposed on one side of the centre pulse and (N−1)/2 pulses are disposed on the other side of the centre pulse). The pulse sequences have (N−1)/2 controllable notch widths between the pulses on each side of the centre pulse. In theory, one harmonic may be eliminated for each controllable notch width such that when N=3 then only one harmonic may be eliminated and when N=5 then two harmonics may be eliminated. An overriding proviso to this is that the sum of the pulse durations must be 120 degrees per half cycle. FIG. 9 shows pulse sequences where N=3, N=5 and N=7.

FIG. 9 also shows the pulse sequence where N=1, which is equally applicable to current source inverter (CSI) rectifiers and thyristor rectifiers. In this case, there are no controllable notch widths and the harmonic structure is fixed. Note that in the interest of clarity, only the first line current of three is shown for the cases N=5 and N=7. As in the cases where N=1 and N=3, the second and third line currents are simply phase displaced from the first line current by 120 and 240 degrees, respectively.

Suitable PWM strategies that can be employed by the PWM controllers Co for power flow, power factor and harmonic control are well known and described in "Pulse width modulation for power converters: principles and practice"; D. Grahame Holmes and Thomas A. Lipo (ISBN: 0-471-20814-0). One example of a suitable PWM strategy is included herein for completeness.

Current source inverter (CSI) rectifiers have six states where two ac voltage lines are connected to the dc voltage lines, three zero states (so-called "shoot through states") where the dc voltage lines are shorted together and connected to one of the ac voltage lines, and an off state where none of the ac voltage lines and dc voltages lines are connected. The matrix converter of the type described in WO 2006/064279 benefits from an additional zero state where the dc voltage lines are shorted together by a freewheel path and are not connected to the ac voltage lines. Current flows in these various states may be represented as space vectors and space vector modulation strategies may be implemented to minimise power losses associated with transitions between states.

Within these modulation strategies, the pulse widths of the various states are modulated in sequence where (a) individual pulse widths within a sampling period affect the time average current that flows between any two points within that sampling period, (b) the phase shift of these individual pulses relative to the fundamental frequency of the ac input voltage affects the power factor and the magnitude of current in the ac voltage lines (as pulse position is moved relative to the ac input voltage waveform the time integral of voltage in any particular pulse varies and this function can be used to control current), and (c) the sequence of pulse widths over a single cycle of the fundamental frequency of the ac input voltage affects the harmonic content of the current in the ac voltage lines and hence in the ac distribution busbar to which the ac voltage lines of the power converter is electrically connected. More particularly, the sequence of pulse widths may repeat asynchronously or synchronously with respect to the fundamental frequency of the ac input voltage, causing the current harmonics in the ac voltage lines to have non-integer and integer frequency relationships, respectively, with the fundamental frequency. Synchronous modulation strategies may be further adapted to cause selective harmonic elimination (SHE) by appropriately choosing the individual pulse widths and the associated number of pulses per cycle of the fundamental frequency of ac input voltage.

Thyristor rectifiers operate according to natural commutation and their control strategies are effectively a subset of the PWM strategies described above since natural commutation forces the current in each ac voltage line to have one pulse of current per half cycle of the fundamental frequency of the ac input voltage. Pulse number and pulse width cannot be adjusted, but the phase shift is comparable to item (b) above. Thus, power factor control and current control are closely linked in thyristor rectifiers and the lack of any ability to control the pulse number and pulse width prevents any harmonic control.

In the case of the systems shown in FIGS. 5 and 6 where the rectifiers SC are used to interface between the double output generators DOG1-DOG4 and the first and second medium voltage busbars MVDC1 and MVDC2 then it is desirable for the busbars to be regulated at a preferred constant value of voltage. The fundamental estimation function block associated with the MV feedback signal MVvfb described above may be simplified to an averaging function whose input is a single MV voltage feedback signal MVvfb and the harmonic estimation function block associated with the MV feedback signal MVvfb described above may be ignored. The power factor estimation function block pf still requires an ac voltage feedback signal and this is taken from the ac terminals of the DOG. The torque regulator function block Treg is ignored and the current reference signal Iref is replaced by the voltage error signal, which in the case of the systems of FIGS. 2 to 4 is used as an input pfref. The power factor reference defaults to its unity power factor value or may be set to any desired value. Although the primary function of the rectifiers SC is to supply a substantially constant dc voltage to distribution busbars MVDC1 and MVDC2, the rectifiers SC retain their capability to regulate the power factor and harmonic content drawn by their ac terminals from the associated ac generator. The fundamental (harmonic order 1) estimation function block "fund" and the harmonic estimation function block "harm" associated with the LV voltage feedback signal LVvfb remain active, as do the associated switching or mixing functions, "fund priority" and "harm priority". It follows that closed-loop regulation of the rectifiers SC may still be used to regulate QPS in the low voltage distribution busbars and in the generator medium voltage ac output—an MV ac supply is still needed to allow the rectifiers SC to provide a MV voltage dc output.

Although the power distribution system of the present invention has been described with reference to marine power distribution and propulsion systems, it will be readily appreciated that the same principles can be used in aircraft-based or land-based applications where motors are interfaced to an ac distribution busbar by means of a power converter.

What is claimed is:

1. A control device configured for connection to a propulsion drive system including a rectifier (i) coupled to an AC generator via a busbar, and a DC motor and (ii) configured to provide a plurality of functions for controlling drive system power characteristics, the control device comprising:
    a controller including (i) a regulator configured to provide a modulation reference signal to the rectifier and (ii) an estimation function block configured to receive AC feedback signals from the propulsion drive system;
    wherein the regulator provides the modulation reference signal responsive to a feedback loop including the AC feedback signals and a received voltage reference signal; and
    wherein the modulation reference signal facilitates control of each of the plurality of functions simultaneously.

2. The control device of claim 1, wherein the busbar is a medium voltage busbar; and
    wherein the regulator is configured to receive a DC feedback signal.

3. The control device of claim 1, wherein the DC motor includes a field converter.

4. The control device of claim 1, wherein the plurality of functions include at least one of modulation depth, modulation angle, and harmonic control.

5. The control device of claim 1, wherein the power characteristics include at least one of power flow control and power factor control.

6. The control device of claim 5, wherein the power characteristics are applied to at least one of medium voltage and low voltage distribution voltages.

7. The control device of claim 1, wherein the controller controls pulse width modulation.

8. The control device of claim 1, wherein the modulation reference signal controls at least one of modulation depth, selective harmonic elimination angles, and a firing delay angle.

9. The control device of claim 1, wherein the AC feedback signals include current and voltage signals.

10. The control device of claim 9, wherein the current signals are output from the AC generator.

11. A method for controlling drive system power characteristics via a control device configured for connection to a propulsion drive system including a rectifier (i) coupled to an AC generator via a busbar, and a DC motor and (ii) configured to provide a plurality of functions, the method comprising:
    providing, via a controller including a regulator, a modulation reference signal to the rectifier; and
    receiving, in the controller via a controller estimation function block, AC feedback signals from the propulsion drive system;
    wherein the regulator provides the modulation reference signal responsive to a feedback loop including the AC feedback signals and a received voltage reference signal; and
    wherein the modulation reference signal facilitates control of each of the plurality of functions simultaneously.

12. The method of claim 11, wherein the plurality of functions include at least one of modulation depth, modulation angle, and harmonic control.

13. The control device of claim 12, wherein the power characteristics include at least one of power flow control and power factor control.

14. The method of claim 11, wherein the modulation reference signal controls at least one of modulation depth, selective harmonic elimination angles, and a firing delay angle.

15. The method of claim 11, wherein the AC feedback signals include current and voltage signals.

16. The method of claim 15, wherein the current signals are output from the AC generator.

17. A non-transitory computer readable media storing computer executable instructions wherein said instructions, when executed, control drive system power characteristics via a control device configured for connection to a propulsion drive system including a rectifier (i) coupled to an AC generator via a busbar, and a DC motor and (ii) configured to provide a plurality of functions, with a method comprising:
    providing, via a controller including a regulator, a modulation reference signal to the rectifier; and
    receiving, in the controller via a controller estimation function block, AC feedback signals from the propulsion drive system;
    wherein the regulator provides the modulation reference signal responsive to a feedback loop including the AC feedback signals and a received voltage reference signal; and
    wherein the modulation reference signal facilitates control of each of the plurality of functions simultaneously.

* * * * *